(12) United States Patent
Mannermaa

(10) Patent No.: US 6,483,867 B1
(45) Date of Patent: Nov. 19, 2002

(54) TRACKING LOOP REALIZATION WITH ADAPTIVE FILTERS

(75) Inventor: Jari Mannermaa, Salo (FI)

(73) Assignee: Nokia Mobile Phones Ltd., Espoo (FI)

( * ) Notice: Subject to any disclaimer, the term of this patent is extended or adjusted under 35 U.S.C. 154(b) by 0 days.

(21) Appl. No.: 09/444,585

(22) Filed: Nov. 22, 1999

(51) Int. Cl.[7] .................................. H04B 1/69
(52) U.S. Cl. ................ 375/149; 375/152; 375/232; 375/326; 375/367; 370/335; 370/515; 708/322
(58) Field of Search ................ 375/140–143, 375/147, 149, 150, 152, 232, 326, 343, 350, 359, 367; 708/300, 314, 322; 370/335, 342, 441, 514, 515; 329/302, 306, 323, 324, 346, 358

(56) References Cited

U.S. PATENT DOCUMENTS

| | | | |
|---|---|---|---|
| 5,799,010 A | 8/1998 | Lomp et al. | 370/335 |
| 5,912,919 A | 6/1999 | Lomp et al. | 375/208 |
| 5,943,363 A * | 8/1999 | Hanson et al. | 342/464 |
| 6,205,167 B1 * | 3/2001 | Kamgar et al. | 375/133 |
| 6,269,075 B1 * | 7/2001 | Tran | 370/206 |
| 6,272,168 B1 * | 8/2001 | Lomp et al. | 370/342 |
| 6,278,726 B1 * | 8/2001 | Mesecher et al. | 370/342 |

FOREIGN PATENT DOCUMENTS

EP 1102415 5/2001 ........... H04B/1/707

OTHER PUBLICATIONS

"Maximum entropy and minimum relative entropy in performance evaluation of digital communication systems"; F. Solms et al; IEE Proceedings: Communications, Institution of Electrical Engineers; vol. 142, No. 4, Aug. 1, 1995, pp. 250–254.

Feedforward Frequency Estimation for PSK: a Tutorial Review; M. Morelli et al; European Transactions on Telecommunications, Eurel Publication, Milano Italy; vol. 9, No. 2, Mar. 1, 1998, pp. 103–116.

"Analysis of Irregularities in the Earth's Rotation", D. Smylie et al, *Methods in Computational Physics,* vol. 1, pp. 402–419, Academic, New York, 1973.

"A New Autoregressive Spectrum Analysis Algorithm", L. Marple, *IEEE Transactions on Acoustics, Speech and Signal Processing,* vol. ASSP–28, No. 4, Aug. 1980, pp. 441–454.

"Use of the Maximum Entropy Method to Predict Atmospheric $CO_2$ Content", J. Mannermaa et al, *Geophysica,* 25, 1 & 2, 1989, pp. 37–46.

* cited by examiner

Primary Examiner—Stephen Chin
Assistant Examiner—Dac V. Ha
(74) Attorney, Agent, or Firm—Ware, Pressola, Van Der Sluys & Adolphson LLP

(57) ABSTRACT

A method, system and device for code-phase tracking and/or carrier tracking the broadcast signal streaming a spread spectrum signal using an adaptive and time variant digital filter based on an AutoRegressive (AR) model of a Maximum Entropy Method (MEM) algorithm for signal filtering. Alternatively, the Maximum Likelihood Method, the Minimum Variance Method or any statistical method can be used in the adaptive filter for noise filtering. The method and device use a code generator to produce a replica of a PRN code and at least two correlators to separately perform signal correlation between the PRN replica and the received spread spectrum signal in order to extract the code signal for code-phase tracking, and the carrier signal for signal tracking. One or more A/D converters are used to convert the received spread spectrum signal into a digital signal so that signal filtering can be performed digitally. A demodulating step is used to extract the message from the received signal. In particular, when the spread spectrum signal is a GPS signal, then the broadcast signal is a CDMA signal and the demodulating step is used to extract the GPS navigation message.

38 Claims, 3 Drawing Sheets

TRACKING LOOP REALIZATION WITH ADAPTIVE FILTERS

FIELD OF THE INVENTION

The present invention relates generally to code tracking and/or carrier tracking a broadcast signal contained in a spread-spectrum signal.

BACKGROUND OF THE INVENTION

A CDMA telephony system is based on spread-spectrum technology and is one of the most widely used digital wireless services today. The spread-spectrum signal requires sophisticated broadcast power management and soft hand-overs between base stations. This means that the base stations must be precisely timed. With the CDMA wireless telephony system, each transmitter must maintain its frequency to within one part in ten billions. Currently, GPS technology enables accurate timing and synchronization between base stations so that cellular calls can be flawlessly passed from one base station to another.

The GPS satellites transmit two microwave carrier signals: the L1 frequency (1575.42 MHz) which carries the navigation message and the Standard Positioning Services (SPS) code signals; and the L2 frequency (1227.60 MHz) which is used for ionospheric delay measurement carried out by the Precise Positioning Services (PPS) equipped receivers. Three binary codes are used to shift the L1 and/or L2 carrier phases: 1) the Coarse Acquisition (C/A) Code, which is a repeating 1.023 MHz Pseudo Random Noise (PRN), code-modulates the L1 carrier phase, spreading the spectrum over a 2.046 MHz bandwidth. For the code-phase modulation, each GPS satellite is assigned a different C/A code PRN, so that each GPS satellite can be identified by a unique PRN code; 2) the Precise (P) Code uses a 10.23 MHz PRN code for modulating both the L1 and L2 carrier phases for the military receivers; and 3) the navigation message, which is used to modulate the L1-C/A or P(Y) code signal, is a 50 Hz signal consisting of data bits that describe the GPS satellite orbits, system time, position, clock corrections, and other system parameters. The position of a certain satellite at a given time is provided by the ephemeris information, which is based on a list of accurate positions or locations of a celestial object as a function of time, available as "broadcast ephemeris" or as post-processed "precise ephemeris".

Signals from the GPS satellites are subject to electromagnetic interference, or EMI. Microwave signals also suffer from absorption and/or scattering by water vapor, massive downpours, dark cloud cover, and man-made and natural obstacles. Therefore, the CDMA signal in a GPS receiver can be very weak and noisy. In telephony applications, it is essential that the CDMA signals be tracked and locked at all times during a telephone connection.

SUMMARY OF THE INVENTION

The present invention provides a method, system and device to lock in and track a weak and noisy CDMA signal streaming in a GPS receiver. However, the present invention can also be applied to tracking a weak and noisy broadcast signal in any spread-spectrum signal. In particular, the spread-spectrum signal contains a unique PRN for code phase modulation and a known carrier frequency.

The method, system and device, according to the present invention, uses an adaptive and time-variant digital filter in the code or carrier tracking loop of the spread spectrum receiver for signal extraction. More specifically, the adaptive and time-variant digital filter is based on the AutoRegressive (AR) model described by a difference equation, computed according to the Maximum Entropy Method (MEM) recursion algorithm as devised by J. P. Burg.

The loop filter used in the spread spectrum receiver or the GPS receiver, according to the present invention, is based on the AR model of the process described by a linear equation as follows:

$$x(t) = a_1 x(t-1) + a_2 x(t-2) + \ldots + a_M x(t-M) + n(t)$$

where $x(t)$ is an observed or new value of the time series; $a_k$'s are the coefficients to be determined; $x(t-k)$ is a known time series; M is the degree of the autoregressive process, and $n(t)$ is an input signal to a system that generates a predicted value of $x(t)$. For example, $n(t)$ can be samples of a Gaussian noise varying with time.

The open loop transfer function of the loop filter as described above is the time series spectrum, represented by the z-transform:

$$F(z) = 1/(1 - a_1 z^{-1} - a_2 z^{-2} - \ldots - a_M z^{-M})$$

where $z^{-1}$ is a delay time unit.

The loop filter must have sufficient memory for storing a plurality of values of the time series so that it can be used to predict the time series ahead of as many values as desired. The major task here is to compute the values of $a_k$. According to the present invention, the coefficients $a_k$ are computed by the Maximum Entropy Method (MEM) which is based on the idea to maximize the entropy of the time series $x(t)$. In that respect, the loop filter is a matched filter. In such a matched filter, the computation is based on the information of the signal contained in the time series $x(t)$, and not on the physical characteristics of the signal. The time series will provide the maximum amount of information for the filtering system.

As is well known in the Information Theory, entropy is defined by:

$$H = -\int_{-\infty}^{\infty} p(x) \log_2(p(x)) dx$$

where $p(x)$ is the probability associated with the value of $x$ in an involved process.

Some restrictions must be made when maximizing the entropy. Assuming that the process is almost or entirely stationary, the entropy can be maximized under the restriction of the following two conditions:

$$\int_{-\infty}^{\infty} p(x) dx = 1$$

and $$\int_{-\infty}^{\infty} p(x) x^2 dx = \sigma^2$$

where $\sigma^2$ is equal to the power of the signal and is a constant.

With the restrictions in place, the entropy is maximized by $dH/dt = 0$. In practice, the maximization can be realized by the Burg's recursion algorithm or any other recursive numerical algorithm. A discussion on the Burg's Maximum Entropy Algorithm can also be found in D. E. Smylie, G. K. C. Clark and T. J. Ulrych "Analysis of Irregularities in the Earth's Rotation" (METHODS IN COMPUTATIONAL PHYSICS, VOL 13, pp. 391–430, Academic, New York, 1973). A representative autoregressive algorithm can be found in L. Marple "A New Autoregressive Spectrum Analysis Algorithm" (IEEE TRANSACTIONS ON ACOUSTICS, SPEECH AND SIGNAL PROCESSING, VOL. ASSP-28, NO.4, AUGUST 1980). The following analysis is based on the approach as disclosed in J. Mannermaa and M. Karras "Use of the Maximum Entropy Method to Predict Atmospheric $CO_2$ Content" (GEOPHYSICA, 25, 1&2, 37–46, 1989).

First, the output power of the times series $S_1$ is estimated after the digital filter order of one (1, $a_{11}$). The filter is operated in the time series both forward and backward. Accordingly, $S_1$ can be expressed as $$S_1 = \left(\sum_{t=1}^{N-1}((x_t - a_{11}x_{t+1})^2 + (x_{t+1} - a_{11}x_t)^2)/(N-1)\right)/2$$

Minimizing $S_1$ as a function of $a_{11}$ gives $$a_{11} = 2 \cdot \sum_{t=1}^{N-1}(x_t \cdot x_{t+1}) \Big/ \sum_{t=1}^{N-1}(x_{t+1}^2 + x_t^2)$$

In general, the length of the filter (m) is increased and the corresponding powers $S_m$ are estimated such that $$S_m = \left\{\sum_{t=1}^{N-m}\left[\left(x_t - \sum_{u=1}^{m}a_{mu}x_{t+u}\right)^2 + \left(x_{t+m} - \sum_{u=1}^{m}a_{mu}x_{t+m-u}\right)^2\right]\right\} \Big/ (N-m)/2$$

It has been known that $$a_{mu} = a_{m-1u} - a_{mm} \cdot a_{m-1m-u}$$

where
  m=2,3, . . . , N−1
  u=1,2, . . . , m−1
  $a_{m0}$=−1
  $a_{mu}$=0 for u≧m By using the formulae of $S_m$ and $a_{mu}$ and $\delta S_m/\delta a_{mm}$=0, the general term $a_{mm}$ can be solved and presented in the following form $$a_{mm} = 2 \cdot \sum_{u=1}^{N-m}(BA_{mu} \cdot BB_{mu}) \Big/ \sum_{u=1}^{N-m}(BA_{mu}^2 + BB_{mu}^2)$$

where
  $BA_{mu}=BA_{m-1u}-a_{m-1\,m-1}\cdot BB_{m-1m-u}$
  $BB_{mu}=BB_{m-1u+1}-a_{m-1m-1}\cdot BA_{m-1u+1}$
  m=2,3, . . . , M
  u=1,2, . . . , N−m
  $BA_{1u}$=x(t)
  $BB_{1u}$=x(t+1)

The digital filter (1, $-a_{11}$, . . . , $a_{mm}$) for implementing the above algorithm is normally presented in the form of (1, $-a_1$, . . . , $a_M$). Such a filter is generally known as the prediction error filter. When this digital filter is used in a spread spectrum or GPS receiver, the coefficients $a_k$ are updated right after every pre-integration sequence. The prediction error filter as described above is shown in FIG. 3.

The first aspect of the present invention is to provide a system and device for code and/or carrier tracking a broadcast signal contained in a spread spectrum signal, wherein the spread spectrum signal includes a code signal and a carrier signal. The system comprises:

a receiver to receive the spread spectrum signal; and
a filtering circuit to process the received signal in order to code-phase tracking the broadcast signal, wherein the filtering circuit includes at least an adaptive and time variant digital filter.

In particular, the adaptive and time variant digital filter is based on an AutoRegressive (AR) model of a Maximum Entropy Method (MEM) algorithm, and wherein the broadcast signal may include a CDMA signal and the spread spectrum signal may include a GPS signal. The device may additionally comprise another filtering circuit to process the received signal for carrier-tracking the broadcast signal. Alternatively, another type of adaptive and time variant digital filters based on the Maximum Likelihood Method, Minimum Variance Method or a statistical signal filtering method is used in lieu of the Maximum Entropy Method.

The second aspect of the present invention is to provide a method of tracking a broadcast signal contained in a spread spectrum signal, wherein the spread spectrum signal contains a code signal and a carrier signal. The method comprises the steps of:

receiving the spread spectrum signal; and
processing the received signal through a filter circuit in order to extract the code signal for code-phase tracking the broadcast signal, wherein the filter circuit comprises an adaptive and time variant digital filter.

In particular, the adaptive and time variant digital filter is based on an AutoRegressive (AR) model of Maximum Entropy Method (MEM) algorithm, and wherein the broadcast signal may include a CDMA signal and the spread spectrum signal may include a GPS signal. Alternatively, another type of adaptive and time variant digital filters based on the Maximum Likelihood Method, Minimum Variance Method or a statistical signal filtering method is used in lieu of the Maximum Entropy Method.

The method may additionally comprise the step of filtering the received signal through the filter circuit for removing a Doppler signal in the carrier signal for carrier tracking the broadcast signal.

The present invention will become apparent upon reading the description taken in conjunction with FIGS. 1 to 3.

DETAILED DESCRIPTION OF THE PREFERRED EMBODIMENTS

Even though the present invention is applicable to the code-phase tracking and carrier tracking of a spread spectrum signal containing a carrier frequency and a PRN code for code-phase modulation, it will be discussed in the context of a GPS receiver. Thus, FIGS. 1 to 2 illustrate a special case of CDMA signal tracking wherein the spread spectrum signal is a GPS signal.

Figure 1:
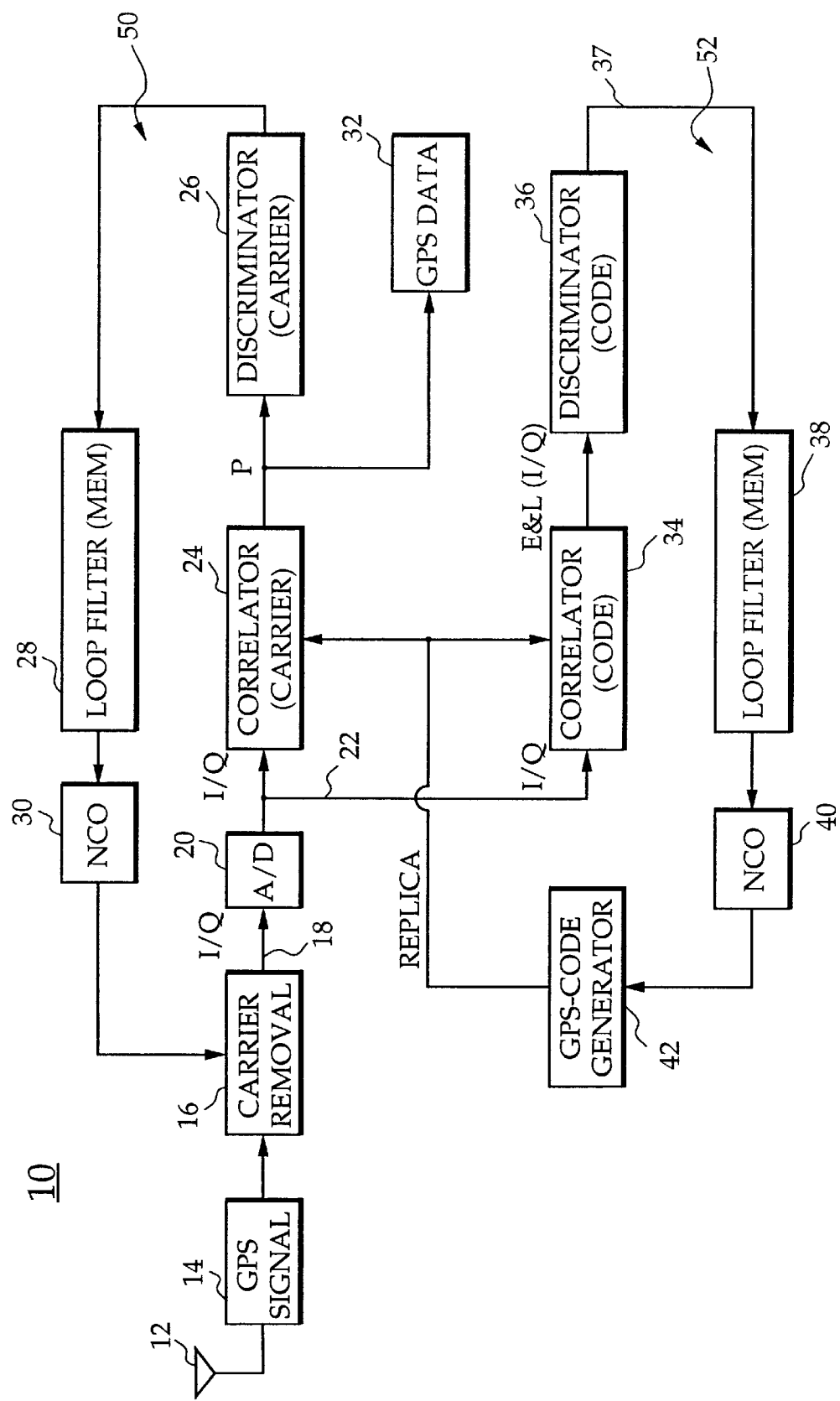
FIG. 1 is a block diagram showing the signal processing functions within a GPS receiver, according to the present invention.

Referring now to FIG. 1, the GPS receiver 10, according to the present invention, includes an antenna 12 and a front end preamplifier and a down converter to receive a GPS signal 14. The received GPS signal 14 is processed by a carrier remover 16 to remove the L1 frequency which carries the navigation message which is a 50 Hz signal for modulating the carrier frequency. The L1 carrier phase is modulated by a Coarse Acquisition (C/A) code, which is a repeating 1.023 MHz Pseudo Random Noise (PRN) code to spread the spectrum over a 2.046 MHz bandwidth. Furthermore, a P(Y) code, which is a repeating 10.23 MHz Pseudo Random Noise (PRN) code to spread the spectrum over a 20.46 MHz bandwidth, is used to modulate the carrier phase of L1 and L2 frequencies. The output signal 18 from the carrier remover 16 contains an in-phase (I) and a quadrature (Q) output. The signal 18 is processed by one or more A/D converters 20 to become a digital signal 22. From hereon the receiver is divided into two phase-locked loops 50, 52. Loop 50, which contains a correlator 24, a discriminator 26, a Maximum Entropy Method (MEM) loop filter 28 and a Numerically Controlled Oscillator (NCO) 30, is used to demodulate the 50 Hz navigation message from the received GPS signal. The navigation message, or GPS data 32, is extracted from the output of the correlator 24. By keeping track of the changes to the NCO 30, the carrier frequency phase can be tracked and measured. Thus, the loop 50 is also used to remove the Doppler signal contained in the received GPS signal. The loop 52, which contains a correlator 34, a discriminator 36, a MEM loop filter 38, an NCO 40 and a GPS-Code generator 42 is used for code-phase tracking. The GPS Code generator 42 is used to generate a replica of a certain PRN code to track the signal transmitted from a certain GPS satellite. The generated replica is fed into both correlator 24 and correlator 34. In particular, the GPS Code generator 42 may comprise a circular shift register of 1023 chips (or 4095 chips for the P(Y) code) which contains a series of PRN codes to provide unique identities to the GPS satellites. The code-phase tracking loop 52 also uses time-delay devices (FIG. 2) to delay the generated PRN replica so as to allow the correlator 34 to perform early (E) and late (L) correlation of the digital signal 22. Mostly a delay is +½ and −½ chip for the present solutions, but it can be shorter. For example, a 0.1 chip delay can be used if a narrow correlator solution is applied, or a combination of several parallel correlators can be used such that some correlators work at a spacing of a 0.1 chip, some with a 0.2 chip and some with a 0.5 chip, for example. As shown, the digital signal 22 is simultaneously fed to the correlator 22 and the correlator 24 to obtain a detected signal power of the carrier signal and the code signal, respectively. While the output of the correlator 24 contains the results of prompt or punctual (P) correlation, the output of correlator 34 contains the results of the early and late correlations (E & L, see FIG. 2). The results of the early and late correlations are fed to the discriminator 36 to produce an error signal 37. For example, the error signal 37 can be of the form (E−L)/(E+L). From the error signal 37, the MEM loop filter 38 produces an input signal to the NCO 40 for steering the local PRN reference code generated by the code generator 42. Likewise, the results of the prompt correlation are processed by the discriminator 26 and the MEM loop filter 28 to produce an input signal for the NCO 30. The NCO 30 forms a digital code which is used to address the sine and cosine table (see blocks 31 and 33 of FIG. 2) to create in-phase and quadrature outputs of the carrier remover 16 in order to maintain phase information contained in the received signal 14. In particular, the sine and cosine table contains N bits so that a 360 degree angle can be divided into $_2N$ intervals, where N is a positive integer equal to or greater than 2.

Figure 2:
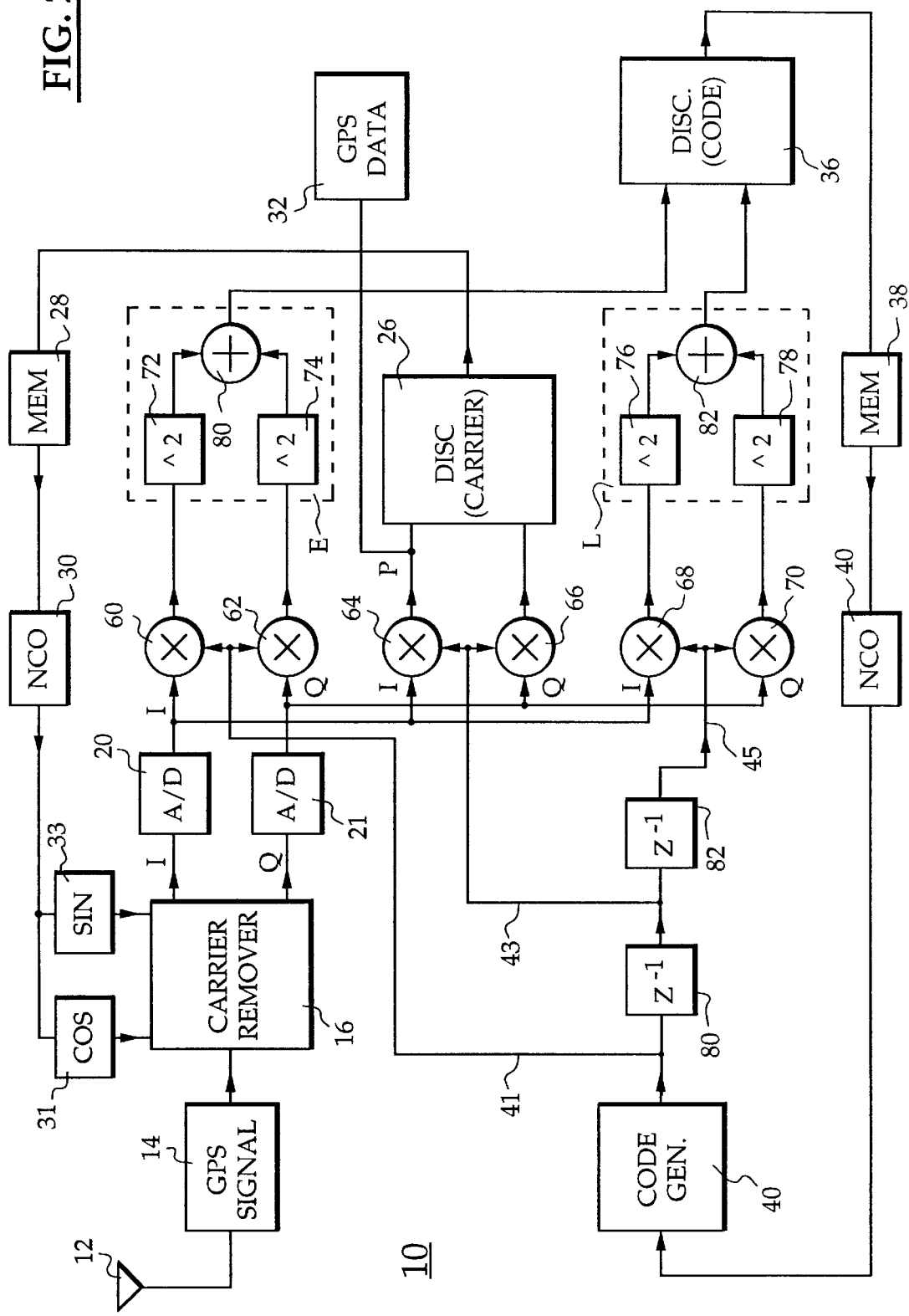
FIG. 2 is a block diagram showing a more detailed description of the GPS receiver, according to the present invention.

FIG. 2 is a block diagram for showing the details of separating the I and Q samples as well as the Early (E), Prompt or Punctual (P) and Late (L) correlation paths. After the received GPS signal 14 is processed through the carrier remover 16, the in-phase (I) samples and the quadrature (Q) samples are separately converted into digital signals by two A/D converters 20, 21. It should be noted that the A/D converters can also be situated before the carrier remover 16. The digital I samples are fed to a plurality of mixers or phase detectors 60, 64 and 68, while the digital Q samples are fed to a plurality of mixers or phase detectors 62, 66 and 70. At the same time, a replica of a certain PRN code sequence 41 is fed to mixers or phase detectors 60 and 62 to detect the code phase signal in the early I and Q samples, respectively. The detected code phase signal in the early I and Q samples are squared and summed in blocks 72, 72 and 80 to produce the detected early code-phase signal power 81. The generated PRN code sequence 41 is also delayed by two delay time units in blocks 80 and 82. The delay time is typically ½ chip, but it can be shorter, e.g. a 0.1 chip if a narrow correlator solution is applied. The purpose of using the delay time units 80 and 82 is to equalize the chip length of the PRN code sequence of the received signal and the chip length of the replica, and to synchronize the chip starting point of the PRN code sequence of the received signal and the chip starting point of the replica. In this respect, the delay of the PRN replica is to adjust the chip of the PRN replica in order to match the chip of the PRN replica to that of the received signal. The twice-delayed sequence 45 is fed to the mixers or phase detectors 68 and 70 to detect the code phase signal in the late I and Q samples, respectively. The detected code phase signals in the late I and Q samples are squared and summed in blocks 76, 78 and 82 to produce the detected late code-phase signal power 83. As with the block diagram shown in FIG. 1, the results of the early and late code-phase signal power are fed to the discriminator 36 to produce an error signal 37, to be processed by the MEM loop filter 38. The once-delayed sequence 43 is fed to the mixers or phase detectors 64 and 66 to detect the code phase signal in the prompt (P) I and Q samples, respectively. The detected code phase signals are further processed by the discriminator 26, the MEM loop filter 28 and the NCO 30 in order to measure and track the Doppler shift in the carrier frequency. The NCO 30 forms a digital code which is used to address the sine table 31 and cosine table 33 to create in-phase and quadrature outputs of the carrier remover 16.

Figure 3:
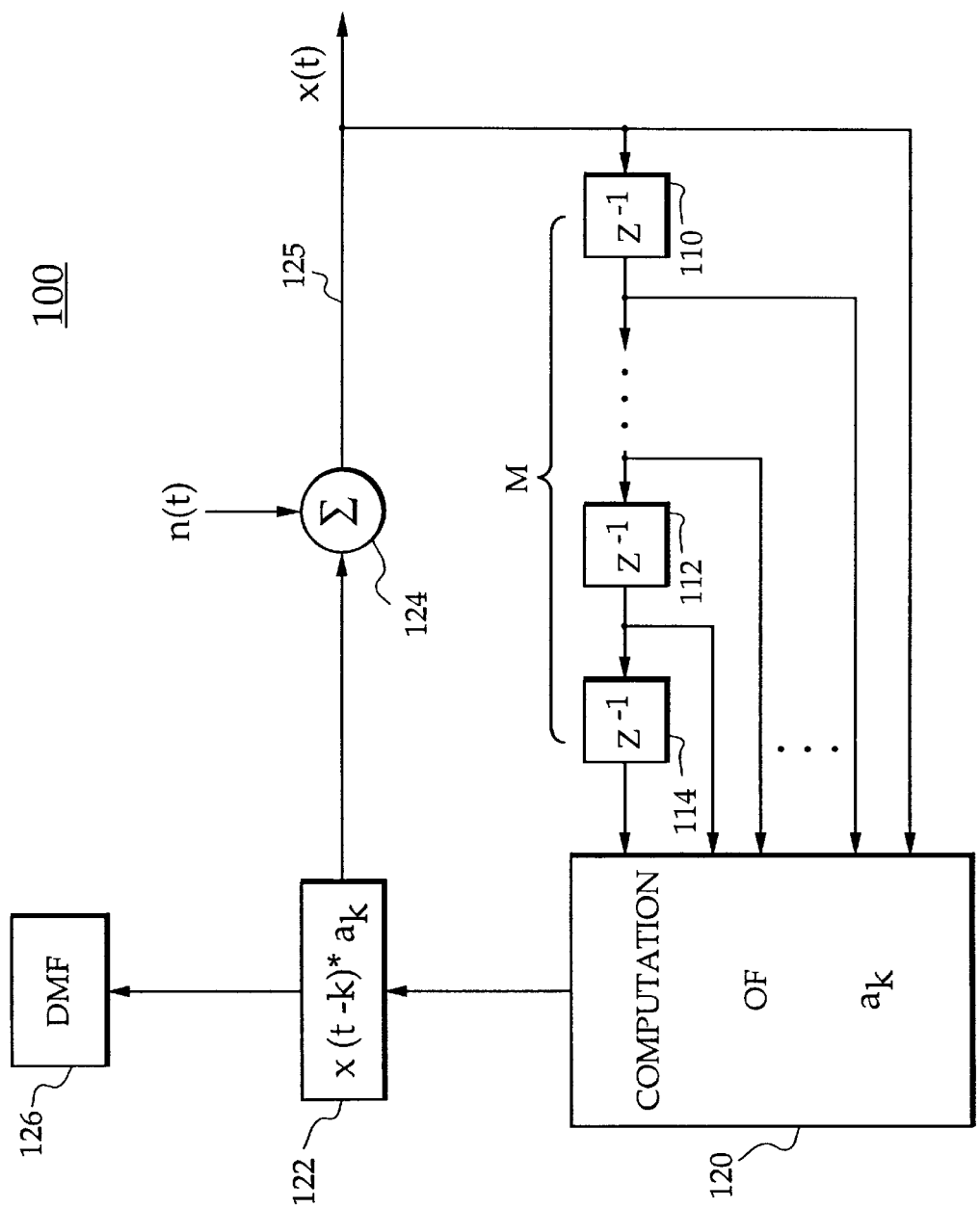
FIG. 3 is a block diagram showing an MEM loop filter.

FIG. 3 is a block diagram showing a prior art MEM loop filter 100 which uses the new value of the time series together with a series of the past values in the time series to compute the coefficients $a_k$ in a processing unit 120. The past values are obtained from delaying a value x(t) of the time series by a series of time delay units 110, 112, 114. The algorithm for computing the coefficients has been described in the Summary of the Invention. From the computed coefficients, a predicted value of the time series 125 can be obtained by performing a convolution of the computed coefficients $a_k$ and x(t−k) (block 122) with a noise term n(t) added in an integrator 124. The predicted value of the time series is then compared to the measured new value of the time series to obtain an error signal.

The Decision Making Function (DMF) 126 is applied to the loop filter in order to achieve the final control value after the desired number of predictions have been performed by the MEM loop filter 100.

Although the invention has been described with respect to a preferred embodiment thereof, it will be understood by those skilled in the art that the foregoing and various other changes, omissions and deviations in the form and detail thereof may be made without departing from the spirit and scope of this invention. For example, the present invention has been disclosed above in the context of a GPS receiver using at least one MEM loop filter for noise filtering. It is, however, possible that any loop filter, such as the filter based on the Maximum Likelihood Method, Minimum Variance Method, or a statistical signal filtering method can be used in the receiver for code tracking the CDMA signal.

What is claimed is:

1. A device for code and/or carrier tracking a broadcast signal contained in a spread spectrum signal, wherein the spread spectrum signal includes a code signal and a carrier signal, said device comprising:

a receiver to receive the spread spectrum signal; and a filtering circuit to process the received signal for code-tracking the broadcast signal, wherein the filtering circuit includes at least an adaptive and time variant digital filter, wherein the adaptive and time-variant digital filter is based on a statistical signal processing algorithm for statistically computing and periodically updating coefficients in a time series that describes the time-variant digital filter, and wherein the time-variant digital filter is a loop filter.

2. The device of claim 1, wherein the adaptive and time variant digital filter is based on an AutoRegressive (AR) model of a Maximum Entropy Method (MEM) algorithm for signal processing.

3. The device of claim 1, wherein the adaptive and time variant digital filter is based on a Maximum Likelihood Method algorithm for signal processing.

4. The device of claim 1, wherein the adaptive and time variant digital filter is based on a Minimum Variance Method algorithm for signal processing.

5. The device of claim 1, wherein the adaptive and time variant digital filter is based on a statistical signal filtering method.

6. The device of claim 1, wherein the broadcast signal is a CDMA signal.

7. The device of claim 1, wherein the filtering circuit also processes the received signal for carrier-tracking the broadcast signal.

8. The device of claim 1, wherein the received signal contains a GPS signal in which a Coarse Acquisition (C/A) or P(Y) code in the form of a Pseudo Random Noise (PRN) is used to modulate the carrier signal.

9. The device of claim 8, wherein the filtering circuit comprises:

a carrier remover to remove the carrier signal from the received signal in order to produce a first signal;

a code generator to generate a replica of the PRN code;

a correlator to perform signal correlation between the PRN replica and the first signal in order to produce a second signal to be processed by the adaptive and time variant digital filter, and an oscillator for steering the PRN replica based on a third signal produced from the second signal by the adaptive and time variant digital filter.

10. The device of claim 9, wherein the first signal contains an in-phase signal and a quadrature signal.

11. The device of claim 9, wherein the PRN code of the received signal has a chip length and the replica of the PRN code has a chip length, said filtering circuit further comprising means for equalizing the chip length of the PRN code of the received signal and the chip length of the replica.

12. The device of claim 9, wherein the PRN code of the received signal has a chip starting point and the replica of the PRN code has a chip starting point, said filtering circuit further comprising means for synchronizing the chip starting point of the PRN code of the received signal and the chip starting point of the replica.

13. The device of claim 9 wherein the oscillator comprises a Numerically Controlled Oscillator (NCO).

14. The device of claim 8, wherein the PRN replica is generated by a circular shift register of N chips with N being a positive integer and the filtering circuit further comprises means for adjusting the chip of the PRN replica prior to the signal correlation between the PRN replica and the first signal by the correlator.

15. The device of claim 8, wherein the GPS signal contains a navigation message signal modulating the carrier signal, and the filtering circuit comprises:

a carrier remover to remove the carrier signal from the received signal in order to produce a first signal;

a code generator to generate a replica of the PRN code;

a correlator to perform signal correlation between the PRN replica and the first signal in order to produce a second signal to be processed by the adaptive and time variant digital filter; and an oscillator for demodulating the navigation message signal from the GPS signal based on a third signal produced from the second signal by the adaptive and time variant digital filter.

16. The device of claim 15 wherein the oscillator comprises a Numerically Controlled Oscillator (NCO).

17. The device of claim 1, wherein the filtering circuit further comprises at least one A/D converter to convert the received signal into a digital signal.

18. A method of tracking a broadcast signal contained in a spread spectrum signal, wherein the spread spectrum signal contains a code signal and a carrier signal, said method comprising the steps of:

receiving the spread spectrum signal; and processing the received signal through a filtering circuit in order to extract the code signal for code-tracking the broadcast signal, wherein the filtering circuit includes at least an adaptive and time variant digital filter, wherein the adaptive and time-variant digital filter is based on a statistical signal processing algorithm for statistically computing and periodically updating coefficients in a time series that describes the time-variant digital filter, and wherein the time-variant digital filter is a loop filter.

19. The method of claim 18, wherein the adaptive and time variant digital filter is based on an AutoRegressive (AR) model of a Maximum Entropy Method (MEM) algorithm for signal processing.

20. The method of claim 18, wherein the adaptive and time variant digital filter is based on a Maximum Likelihood Method algorithm for signal processing.

21. The method of claim 18, wherein the adaptive and time variant digital filter is based on a Minimum Variance Method algorithm for signal processing.

22. The method of claim 18, wherein the adaptive and time variant digital filter is based on a statistical signal filtering method algorithm for signal processing.

23. The method of claim 18, wherein the filtering circuit further extracts the carrier signal for carrier-tracking the broadcast signal.

24. The method of claim 18, wherein the broadcast signal is a CDMA signal.

25. The method of claim 18, wherein the received signal contains a GPS signal in which a Coarse Acquisition (C/A) or P(Y) code in the form of a Pseudo Random Noise (PRN) is used to modulate the carrier signal.

26. The method of claim 25, further comprising the steps of:
- removing the carrier signal from the received signal in order to produce a first signal;
- generating a replica of the PRN code;
- performing a signal correlation between the PRN replica and the first signal in order to produce a second signal; and
- processing the second signal with the adaptive and time variant digital filter.

27. The method of claim 26, wherein the GPS signal contains a navigation message signal modulating the carrier signal, said method further comprising the step of demodulating the navigation message signal from the received GPS signal based on a third signal produced from the second signal by the adaptive and time variant digital filter in order to extract the navigation message.

28. The method of claim 26, wherein the received signal contains a Doppler signal, said method further comprising the step of using a Numerically Controlled Oscillator (NCO) to remove the Doppler signal from the received signal based on a third signal produced from the second signal by the adaptive and time variant digital filter for code-tracking the broadcast signal.

29. The method of claim 26, wherein the first signal contains an in-phase signal and a quadrature signal.

30. The method of claim 26, further comprising the step of using a Numerically Controlled Oscillator (NCO) to steer the PRN replica based on a third signal produced from the second signal by the adaptive and time variant digital filter for code-tracking the broadcast signal.

31. The method of claim 26, wherein the PRN replica is generated by a circular shift register of N chips with N being a positive integer, said method further comprising the step of adjusting the chip of the PRN replica prior to the signal correlation between the PRN replica and the first signal by the correlator.

32. A system for extracting a message from a broadcast signal contained in a spread spectrum signal wherein the spread spectrum signal includes a code signal and a carrier signal, said system comprising:
- a receiver to receive the spread spectrum signal via the antenna; and
- a signal processor to process the received signal,
- wherein the signal processor comprises a device for code-tracking the broadcast signal having at least an adaptive and time variant digital filter,
- wherein the adaptive and time-variant digital filter is based on a statistical signal processing algorithm for statistically computing and periodically updating coefficients in a time series that describes the time-variant digital filter, and
- wherein the time-variant digital filter is a loop filter.

33. The system of claim 32, wherein the adaptive and time variant digital filter is based on an AutoRegressive (AR) model of a Maximum Entropy Method (MEM) algorithm for signal processing.

34. The system of claim 32, wherein the adaptive and time variant digital filter is based on a Maximum Likelihood Method algorithm for signal processing.

35. The system of claim 32, wherein the adaptive and time variant digital filter is based on a Minimum Variance Method algorithm for signal processing.

36. The system of claim 32, wherein the adaptive and time variant digital filter is based on a statistical signal filtering method algorithm for signal processing.

37. The system of claim 32, wherein the filtering circuit also processes the received signal for carrier-tracking the broadcast signal.

38. The system of claim 32, wherein the broadcast signal is a CDMA signal.

* * * * *

UNITED STATES PATENT AND TRADEMARK OFFICE
CERTIFICATE OF CORRECTION

PATENT NO.    : 6,483,867 B1
DATED         : November 19, 2002
INVENTOR(S)   : Mannermaa It is certified that error appears in the above-identified patent and that said Letters Patent is hereby corrected as shown below:

Column 5,
Line 66, "$_2N$" should be -- $2^N$ --.

Signed and Sealed this

Thirteenth Day of May, 2003

JAMES E. ROGAN
*Director of the United States Patent and Trademark Office*